United States Patent
Magana-Mora et al.

(10) Patent No.: US 11,519,257 B2
(45) Date of Patent: Dec. 6, 2022

(54) AUTOMATIC SLIPS DETECTION SYSTEM FOR THE OPTIMIZATION OF REAL-TIME DRILLING OPERATIONS

(71) Applicant: SAUDI ARABIAN OIL COMPANY, Dhahran (SA)

(72) Inventors: Arturo Magana-Mora, Dhahran (SA); William Contreras Otalvora, Dhahran (SA); Michael Affleck, Aberdeen (GB); Chinthaka Pasan Gooneratne, Dhahran (SA); Mahmoud Abughaban, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 312 days.

(21) Appl. No.: 16/939,745

(22) Filed: Jul. 27, 2020

(65) Prior Publication Data
US 2022/0025759 A1    Jan. 27, 2022

(51) Int. Cl.
*E21B 44/00* (2006.01)
*E21B 47/007* (2012.01)
(Continued)

(52) U.S. Cl.
CPC ............ *E21B 44/00* (2013.01); *E21B 19/165* (2013.01); *E21B 44/005* (2013.01); *E21B 44/04* (2013.01);
(Continued)

(58) Field of Classification Search
CPC .... E21B 47/007; E21B 47/002; E21B 19/165; E21B 44/005; E21B 44/04; E21B 45/00;
(Continued)

(56) References Cited

U.S. PATENT DOCUMENTS

| 5,107,705 A | 4/1992 | Wraight et al. |
| 2019/0136650 A1 | 5/2019 | Zheng et al. |

(Continued)

FOREIGN PATENT DOCUMENTS

EP    3149272 B1    3/2020

OTHER PUBLICATIONS

International Search Report and Written Opinion issued in corresponding International Application No. PCT/US2020/053727, dated Apr. 15, 2021 (16 pages).

(Continued)

*Primary Examiner* — Aditya S Bhat
(74) *Attorney, Agent, or Firm* — Osha Bergman Watanabe & Burton LLP

(57) ABSTRACT

A method for determining a slips status during a drilling operation of a subterranean formation. The method includes capturing, using one or multiple camera devices mounted on a drilling rig of the drilling operation, a plurality of images, each of the plurality of images comprising a portion that corresponds to a slips device of the drilling rig, generating, using a sensor device of the drilling rig, a plurality of parameters of the drilling rig, wherein the plurality of parameters are synchronized with the plurality of images, providing, by a computer processor, the plurality of parameters as input to a machine learning model of the drilling rig, and analyzing, by the computer processor and based on the machine learning model, the plurality of images to generate the slips status.

20 Claims, 8 Drawing Sheets

(51) Int. Cl.
　　　*E21B 44/04*　　　(2006.01)
　　　*E21B 45/00*　　　(2006.01)
　　　*E21B 19/16*　　　(2006.01)
　　　*E21B 47/002*　　(2012.01)
　　　*G06T 7/70*　　　(2017.01)

(52) U.S. Cl.
　　　CPC ............ *E21B 45/00* (2013.01); *E21B 47/002* (2020.05); *E21B 47/007* (2020.05); *G06T 7/70* (2017.01); *E21B 2200/22* (2020.05); *G06T 2207/30164* (2013.01)

(58) Field of Classification Search
　　　CPC .. E21B 44/00; G06T 2207/30164; G06T 7/70
　　　USPC .......................................................... 702/9
　　　See application file for complete search history.

(56) References Cited

U.S. PATENT DOCUMENTS

| | | | |
|---|---|---|---|
| 2019/0147125 A1* | 5/2019 | Yu ........................ | G06N 3/0445 703/10 |
| 2019/0264516 A1 | 8/2019 | Gutarov et al. | |
| 2020/0224523 A1 | 7/2020 | Parmeshwar et al. | |
| 2022/0178248 A1* | 6/2022 | Chambon ............... | E21B 19/00 |

OTHER PUBLICATIONS

Moralez, Nathan et al., "Intelligent Pipe-Handling: A Case Study for Automation", IADC/SPE-199552-MS, IADC/SPE International Drilling Conference and Exhibition, Galveston, Texas, Mar. 3-5, 2020 (14 pages).

* cited by examiner

AUTOMATIC SLIPS DETECTION SYSTEM FOR THE OPTIMIZATION OF REAL-TIME DRILLING OPERATIONS

BACKGROUND

The core activity during drilling operations is the breaking of rocks to deepen a wellbore. As drilling continues, additional pipes (referred to as "stand") are connected to the drillstring in order to increase the drillstring length and, therefore, the wellbore depth. The term "slips" refers to a device to suspend and grip the drillstring in the rotary table while the crew adds or removes the upper portion of the drillstring. The elapsed time between stopping pipe movement and setting the slips to the recommencement of drilling is referred to as "slips-to-weight," which is critical for both mitigating drilling hazards and optimizing drilling operations.

SUMMARY

In general, in one aspect, the invention relates to a method for determining a slips status during a drilling operation of a subterranean formation. The method includes capturing, using one or multiple camera devices mounted on a drilling rig of the drilling operation, a plurality of images, each of the plurality of images comprising a portion that corresponds to a slips device of the drilling rig, generating, using a sensor device of the drilling rig, a plurality of parameters of the drilling rig, wherein the plurality of parameters are synchronized with the plurality of images, providing, by a computer processor, the plurality of parameters as input to a machine learning model of the drilling rig, and analyzing, by the computer processor and based on the machine learning model, the plurality of images to generate the slips status.

In general, in one aspect, the invention relates to a computer system for determining a slips status during a drilling operation of a subterranean formation. The computer system includes a processor, and a memory coupled to the processor and storing instruction. The instructions, when executed by the processor, include functionality for capturing, using one or more camera devices mounted on a drilling rig of the drilling operation, a plurality of images, each of the plurality of images comprising a portion that corresponds to a slips device of the drilling rig, generating, using a sensor device of the drilling rig, a plurality of parameters of the drilling rig, wherein the plurality of parameters are synchronized with the plurality of images, providing the plurality of parameters as input to a machine learning model of the drilling rig, and analyzing, based on the machine learning model, the plurality of images to generate the slips status.

In general, in one aspect, the invention relates to a non-transitory computer readable medium storing instructions executable by a computer processor for determining a slips status during a drilling operation of a subterranean formation. The instructions, when executed, include functionality for capturing, using one or more camera devices mounted on a drilling rig of the drilling operation, a plurality of images, each of the plurality of images comprising a portion that corresponds to a slips device of the drilling rig, generating, using a sensor device of the drilling rig, a plurality of parameters of the drilling rig, wherein the plurality of parameters are synchronized with the plurality of images, providing the plurality of parameters as input to a machine learning model of the drilling rig, and analyzing, based on the machine learning model, the plurality of images to generate the slips status.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
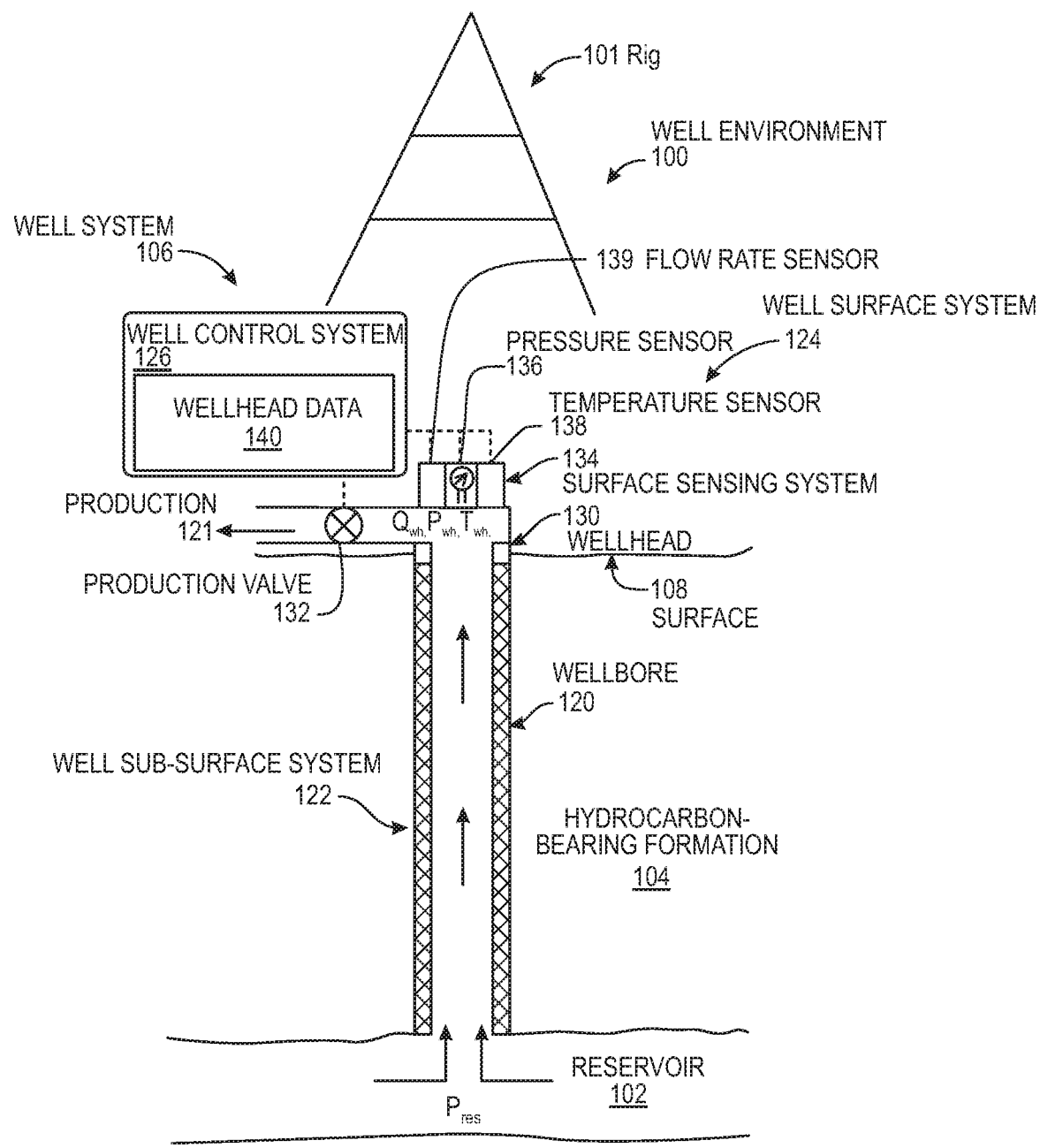
FIGS. 1 and 2 show a system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention provide a method, a system, and a non-transitory computer readable medium for automatic real-time identification of activities that involve the use of slips in a drilling rig. In particular, the activities include slips-to-slips, slips-to-weight, weight-to-slips, and weight-to-weight operations. In one or more embodiments of the invention, a smart camera or vision sensor networks along with image processing techniques, artificial intelligence (AI), and/or deep learning (DL) models are employed to perform the automatic real-time identification. Automatic real-time identification of the slips facilitates (i) accurate computation of slips-to-slips, slips-to-weight and weight-to-slips, and weight-to-weight elapsed times, (ii) connection time analysis and comparison for the optimization of drilling operations, and (iii) mitigation of differential stuck pipe due to long connection times.

Turning to FIG. 1, FIG. 1 shows a schematic diagram in accordance with one or more embodiments. As shown in FIG. 1, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments of the invention, the well system (106) includes a rig (101), a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (700) described below in FIGS. 7A and 7B and the accompanying description.

The rig (101) is the machine used to drill a borehole to form the wellbore (120). Major components of the rig (101) include the mud tanks, the mud pumps, the derrick or mast, the drawworks, the rotary table, topdrive, the drillstring, the power generation equipment and auxiliary equipment. A slips is used to grip and hold the upper part of a drillstring to the drill floor on the rig (101). The slips are constructed as a collection of metal wedges, hinged together to form a circular shape around the drill pipe. On the inside surface, the slips normally has replaceable steel teeth that grips the pipe.

A stand is multiple (e.g., two or three) joints of drill pipes or collars that vertically stand in the derrick of the rig (101). The connection of an additional stand for drilling deeper may include the following steps: 1) stop both the drilling mud circulation and rotation of the drillstring, 2) set slips to hold the drillstring, 3) unscrew the upper portion of the drillstring, 4) attach the upper portion of the drillstring to an additional stand, 5) attach upper portion of drillstring to the lower part suspended by the slips, and 6) remove slips and continue drilling. The elapsed time between setting the slips to start drilling is referred to as "slips-to-weight." The elapsed time between setting and unsetting the slips is referred to as "slips-to-slips."

Moreover, tripping out and into the borehole is a common operation during drilling for multiple purposes, such as change of the bottom hole assembly configuration, drill bit replacement, attachment of logging tools, among others. Similarly, additional stands need to be connected or disconnected when tripping in and out, respectively. The time spent in connection before a trip in/out is referred to as "slips-to-slips trip in" and "slips-to-slips trip out," respectively.

Weight-to-slips, slips-to-weight, slips-to-slips, and weight-to-weight are critical factors for mitigating drilling hazards as one of the leading causes of differential sticking is excessive connection times. Additionally, drilling flat time consumes approximately 65% of a typical well duration, drill pipe tripping by itself accounts for around 70% of the total flat time. As a result, breaking down the tripping operations into segments and focusing on improving the performance of individual segments reveal substantial potential time savings. In one or more embodiments, weight-to-slips, slips-to-weight, and slips-to-slips are computed with improved high accuracy to track drilling performance and avoid drilling hazards. Following drilling a borehole section and tripping out with the drillstring, jointed casing may be installed into the borehole (referred to as casing running) to protect the recently drilled formation from collapse. In one or more embodiments, slips-to-slips for casing running is computed with improved high accuracy to track efficiency of operation and reduce the probability of a stuck drillstring. In addition, the slips-to-slips may also be monitored on completion string or production tubing running activities. In one or more embodiments, the weight-to-slips, slips-to-weight, slips-to-slips, and weight-to-weight are computed with improved high accuracy using the slips monitoring system (200) and the method flowchart depicted in FIGS. 2 and 3, respectively. An example of computing and monitoring weight-to-slips, slips-to-weight, and slips-to-slips with improved high accuracy is described in reference to FIGS. 4A-6 below.

The wellbore (120) includes a bored hole (i.e., borehole) that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the hydrocarbon-bearing formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (134). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120). The surface sensing system (134) may also include sensors for sensing characteristics of the rig (101), such as bit depth, hole depth, drilling mudflow, hook load, rotary speed, etc.

In some embodiments, the surface sensing system (134) includes a surface pressure sensor (136) operable to sense the pressure of production (151) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (151) flowing through the well surface system (124), after it exits the wellbore (120). The flow rate sensor (139) may include hardware that senses a flow rate of production (121) ($Q_{wh}$) passing through the wellhead (130).

Figure 2:
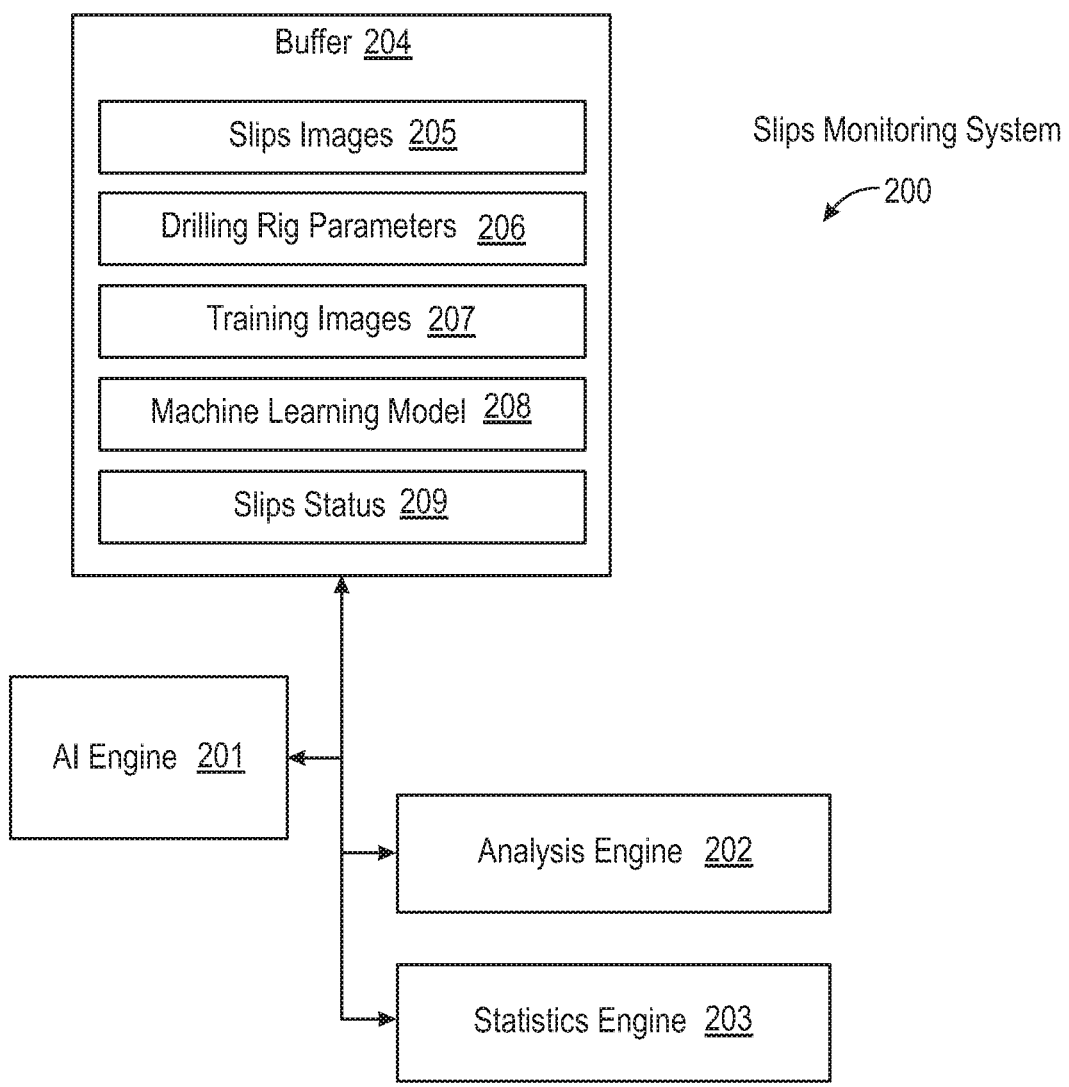

Turning to FIG. 2, FIG. 2 shows a schematic diagram in accordance with one or more embodiments. In one or more embodiments, one or more of the modules and/or elements shown in FIG. 2 may be omitted, repeated, and/or substituted. Accordingly, embodiments of the invention should not be considered limited to the specific arrangements of modules and/or elements shown in FIG. 2.

As shown in FIG. 2, FIG. 2 illustrates the slips monitoring system (200) that has multiple components, including, for example, a buffer (204), an artificial intelligence (AI) engine (201), an analysis engine (202), and a statistics engine (203). In one or more embodiments of the invention, the slips monitoring system (200) is part of the control system (126) described in reference to FIG. 1 above. Each of these components (201, 202, 203, 204) may be located on the same computing device (e.g., personal computer (PC), laptop, tablet PC, smart phone, multifunction printer, kiosk, server, etc.) or on different computing devices that are connected via a network, such as a wide area network or a portion of Internet of any size having wired and/or wireless segments. Each of these components is discussed below.

In one or more embodiments of the invention, the buffer (204) may be implemented in hardware (i.e., circuitry), software, or any combination thereof. The buffer (204) is configured to store data generated and/or used by the slips monitoring system (200). The data stored in the buffer (204) includes the slips images (205), the drilling rig parameters (206), the training images (207), the machine learning model (208), and the slips status (209).

The slips images (205) are a collection of images of the slips in the surroundings of the drill floor on the rig (101). Each of the slips images (205) includes a portion that corresponds to the slips device. The drilling rig parameters (206) are sensor outputs of the surface sensing system (134) and may include bit depth, hole depth, drilling mudflow, hook load, rotary speed, etc. The slips status (209) is the on/off condition of the slips device that is determined by analyzing the slips images (205) using AI techniques. The training images (207) are a collection of labeled images of the slips in the surroundings of the drill floor on the rig (101). Each of the training images (207) includes a portion that corresponds to the slips device as well as a label specifying the known pixel coordinates of the portion corresponding to the slips device. The machine learning model (208) is an AI and/or DL model to recognize the slips in the slips images (205) and the open/shut condition of the slips device. In one or more embodiments of the invention, the machine learning model (208) is any variant of the regional convolutional neural networks (R-CNN) (e.g., fast R-CNN, faster R-CNN, You Only Look Once, among others) combined with any data augmentation techniques.

In one or more embodiments of the invention, each of the AI engine (201), analysis engine (202), and statistics engine (203) may be implemented in hardware (i.e., circuitry), software, or any combination thereof. In one or more embodiments, the AI engine (201) is configured to generate the machine learning model (208) based on the training images (207) and the drilling parameters (206). Each training image in the training images (207) may have a similar format (e.g., resolution) as one of the slips images (205). In one or more embodiments, additional synthetic images may be created by using data augmentation techniques (i.e., pixel and image scaling, RGB to grayscale conversion, contrast and brightness adjustments, and horizontal flipped images, among others). In contrast to the slips images (205), each training image in the training images (207) already includes confirmed pixel coordinates of the portion corresponding to the slips device. In one or more embodiments, the AI engine (201) generates the machine learning model (208) using a machine learning technique.

In one or more embodiments, the analysis engine (202) is configured to synchronize the slips images (205) and the drilling rig parameters (206), providing the drilling rig parameters (206) as inputs to the machine learning model (208), and to analyze the slips images (205) based on the machine learning model (208) to generate the slips status (209).

In one or more embodiments, the statistics engine (203) is configured to generate slips status statistics (e.g., elapsed slips-to-slips time, elapsed slips-to-weight time, elapsed weight-to-slips time, elapsed weight-to-weight time, etc.) based on the slips status (209). The statistics engine (203) is further configured to generate alerts and actionable items based on the slips status statistics.

In one or more embodiments, the AI engine (201), analysis engine (202), and statistics engine (203) collectively perform the functionalities described above using the method described in reference to FIG. 3 below. Although the slips monitoring system (200) is shown as having three engines (201, 202, 203), in other embodiments of the invention, the slips monitoring system (200) may have more or fewer engines and/or more or fewer other components. Further, the functionality of each component described above may be split across components. Further still, each component (201, 202, 203) may be utilized multiple times to carry out an iterative operation.

Figure 3:
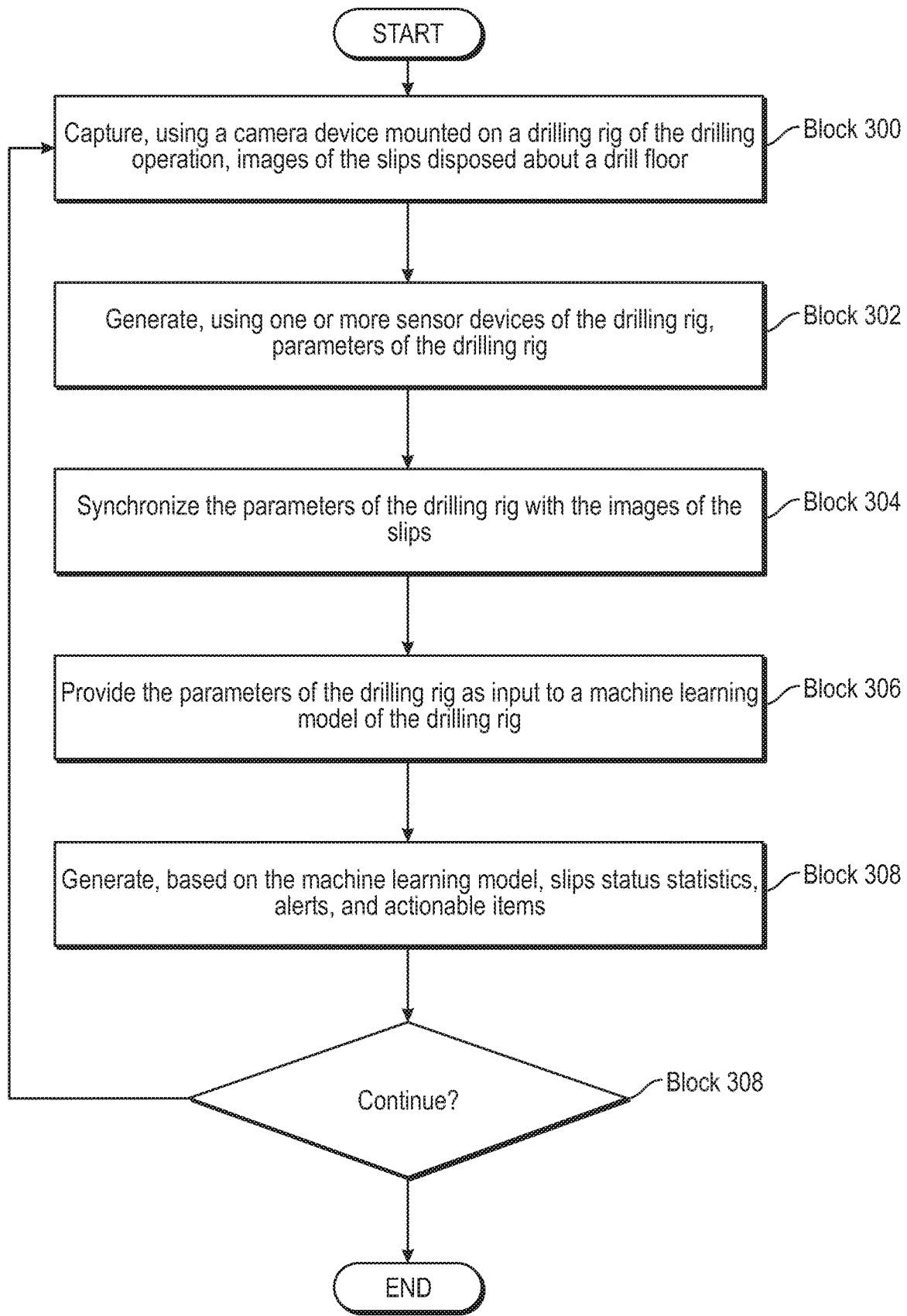
FIG. 3 shows a flowchart in accordance with one or more embodiments.

Turning to FIG. 3, FIG. 3 shows a method flowchart in accordance with one or more embodiments. Specifically, FIG. 3 describes a method for determining a slips status during a drilling operation of a subterranean formation. One or more blocks in FIG. 3 may be performed using one or more components as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially in Block 300, a camera device is mounted on a drilling rig and is used to capture images of the slips device disposed about the drill floor of the drilling rig. Each image includes a portion that corresponds to the slips device in the surroundings of the drilling rig.

In Block 302, parameters of the drilling rig are generated using sensor device(s) of the drilling rig. Each sensor device is a surface sensor that measures a parameter of bit depth, hole depth, drilling mudflow, hook load, rotary speed, or any other relevant parameter.

In Block 304, the parameters of the drilling rig are synchronized with the set of images of the slips device. In one or more embodiments, the parameters are measured continuously over time while the images of the slips device are captured periodically and assigned respectively time stamps. The parameters and images are synchronized by linking each image of the slips device to the parameter value corresponding to the time stamp of the image.

In Block 306, the parameters of the drilling rig are provided as input to a machine learning model of the drilling rig. In one or more embodiments, the parameters are used as conditions to tune or otherwise customize the machine learning model. In such embodiments, the machine learning model is trained based on multiple combinations of parameter values. An example of training the machine learning model is described in reference to FIG. 6 below.

In Block 308, the images of the slips device are analyzed based on the machine learning model to generate the slips status. In one or more embodiments, each image is analyzed to extract a set of predefined features (i.e., a feature vector) that are fed into the machine learning model. In other embodiments, convolutional neural networks or similar DL models may be used to automatically extract a set of abstract features from the images. By comparing the extracted feature vector to feature vector values associated with learned slips features and slips status (e.g., on, off, or other positions), the slips is recognized in the image and the slips status is generated accordingly based on the machine learning model. In one or more embodiments, the time when the slips status is generated is recorded as a time stamp assigned to the slips status.

In Block 3010, a determination is made as to whether to continue monitoring the slips status. If the determination is negative, i.e., the monitoring is not to continue, the method ends. If the determination is positive, i.e., the monitoring is to continue, the method returns to Block 300 to start a subsequent iteration of the method flowchart. In one or more embodiments, the method flowchart is performed in real-time in the sense that a single iteration from Block 300 through Block 308 is performed within a short amount of time, such as one second or other predetermined time limit. In this context, the term "real-time" refers to the short amount of time. In other words, the slips status is determined based on real-time drilling rig parameters and real-time slips images.

As the method flowchart is performed continuously over multiple iterations, any change in the slips status is detected in real-time with recorded time stamp. In one or more embodiments, the elapsed slips-to-slips time, elapsed slips-to-weight time, elapsed weight-to-slips time, and/or elapsed weight-to-weight time are computed based on the time stamps of subsequent changes of the slips status. Each of the elapsed time may be compared to a preset time threshold, and an alert is generated in response to detecting any elapsed time exceeding the corresponding preset time threshold. For example, the alert may correspond to a stuck pipe. In one or more embodiments, one or more actionable item is generated in response to the alert or a combination/sequence of alerts. For example, the actionable item may correspond to a standard trouble shooting procedure to address the stuck pipe condition. In one or more embodiments, the slips status, various elapsed time, alert(s) and actionable item(s) are presented to a user (e.g., a drilling rig crew member). For example, slips status, various elapsed time, alert(s) and/or actionable item(s) may be displayed for the drilling rig crew to view. Accordingly, the drilling operation is performed based at least on the slips status. For example, the drilling operation may be performed expediently and efficiently by the drilling rig crew who are timely informed of the slips status, various elapsed time, alert(s) and/or actionable item(s).

Turning to FIGS. 4A-6, FIGS. 4A-6 provides an example of automatic slips detection for a drilling rig. The example shown in FIGS. 4A-6 may be, for example, based on one or more components depicted in FIGS. 1-2 above and the method flowchart depicted in FIG. 3 above. In one or more embodiments, one or more of the modules and/or elements shown in FIGS. 4A-6 may be omitted, repeated, and/or substituted. Accordingly, embodiments of the invention should not be considered limited to the specific arrangements of modules and/or elements shown in FIGS. 4A-6.

Figure 4A:
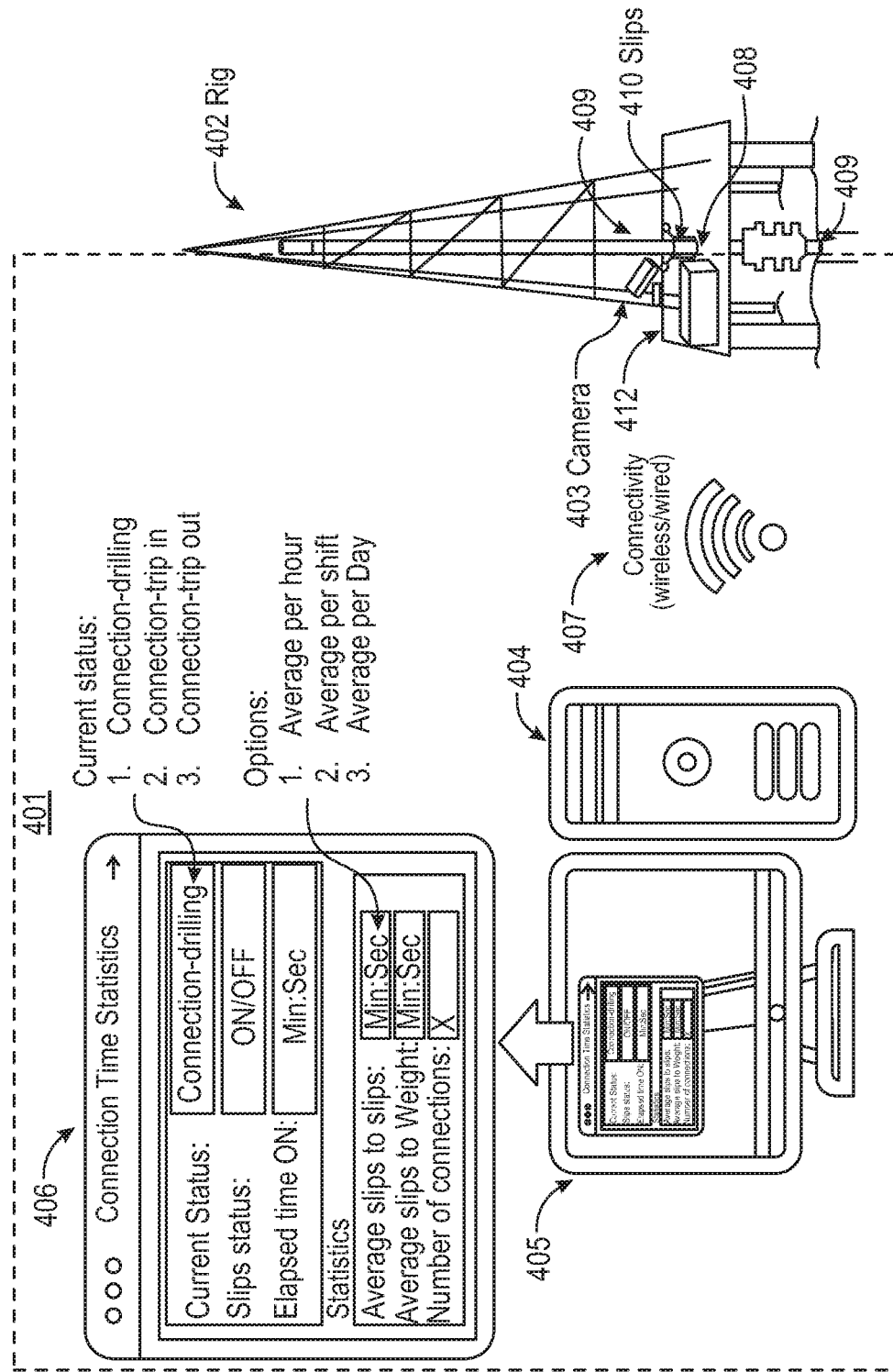
FIGS. 4A, 4B, 5, and 6 show an example in accordance with one or more embodiments.
Figure 4B:
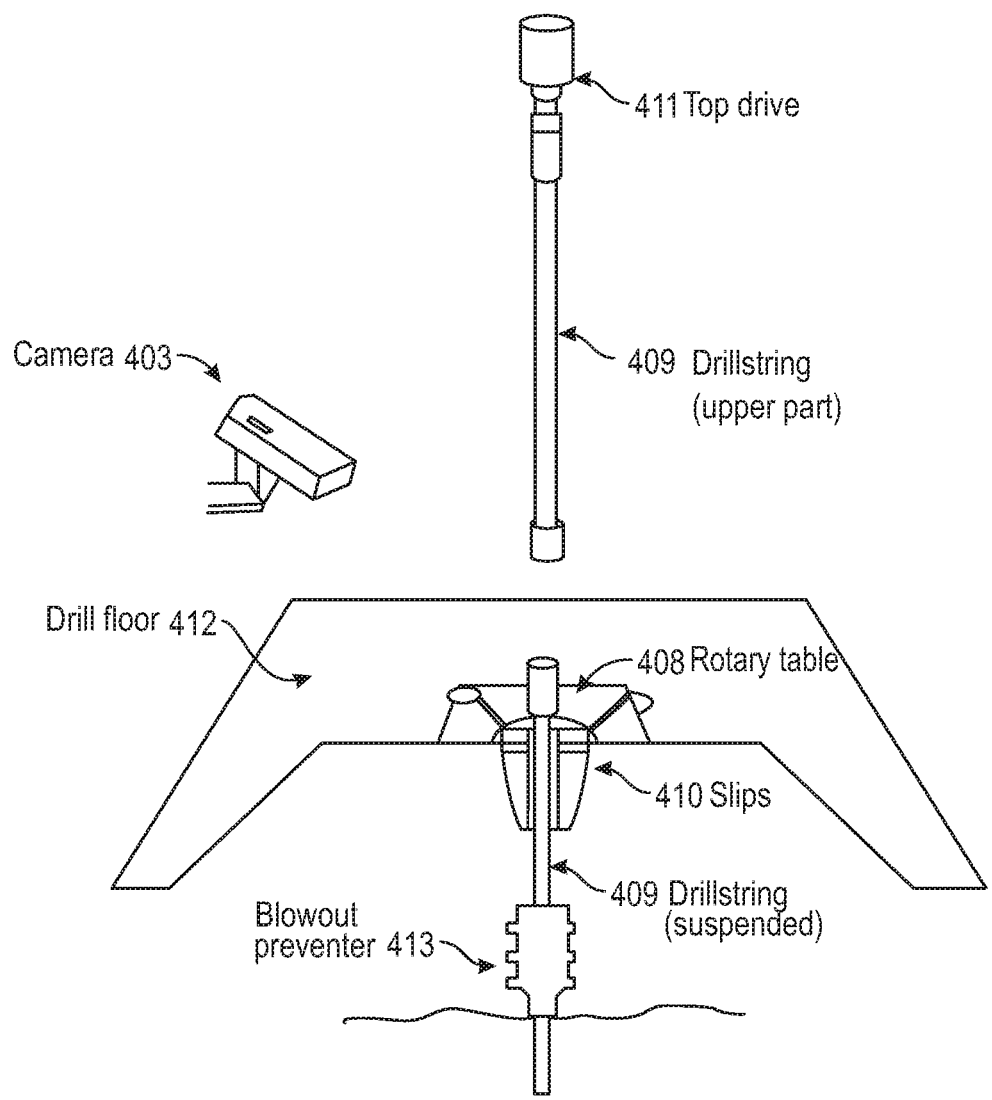

FIG. 4A illustrates an example internet of things (IoT) platform (401) to be used on a drilling rig (402) for automatic real-time monitoring of the slips. The IoT platform (401) enables real-time analysis of new sensors and data streams to provide advanced solutions for optimizing drilling operations. The drilling rig (402) is an example of the rig (101) described in reference to FIG. 1 above. As shown in FIG. 4, the IoT platform (401) includes a camera (403) to capture rig alignment and drilling dynamics, a server (404) for image/video processing based on AI/DL, and a display (405) for presenting status, statistics, alerts, alarms, and recommendations to the rig crew via a user interface (406). In particular, the server (404) is an implementation example of the slips monitoring system (200) described in reference to FIG. 2 above. The camera (403), server (404), and display (405) communicate with each other via wireless/wired connection (407). The camera (403) is a smart, waterproof, high resolution, and wireless cameras. The camera (403) may be based on any image or vision sensor, including infrared, gamma ray, CT scan, x-ray, among others, for image/video capture. The image/video processing may be performed locally at the rig (402) and/or using computing, storage, and networking resources anywhere from the rig (402) to the Cloud. In this context, the server (404) is referred to as edge/fog computing hardware and software. In particular, edge/fog computing refers to extending cloud computing to the edge of an enterprise's network to facilitate the computing, storage and networking services between edge devices and cloud computing data centers.

The camera (403) is mounted on the drilling rig structure on the drill floor (412) to capture image/video of the rotary table (408), drillstring (409), and slips (410). Further, the drillstring (409) includes an upper part and a suspended portion that are together driven by a top drive mechanism (411) and a rotary table (408). The slips (410) suspends and grips the drillstring (409) in the rotary table (408) while the rig crew adds or removes the upper part of the drillstring (409). The suspended portion of the drillstring (409) is equipped with a blowout preventer (413) used to prevent uncontrolled release of crude oil or natural gas from the well.

Returning to the discussion of FIG. 4A, images/videos captured by the camera (403) are analyzed using the edge/fog computing hardware and software based on AI/DL models to identify exact moments when the slips (410) are used by the rig crew and the elapsed slips-to-slips, slips-to-weight, weight-to-slips, and weight-to-weight times. The user interface (406) displays the presence of the slips, current status, current elapsed time, as well as the statistics with the average elapsed time per hour, shift, or day. An alert or alarm is generated whenever the actual times exceed a time threshold. Finally, the actionable items and statistics are displayed in real-time for the rig crew and may be sent to a remote operation center through satellite communication.

Figure 5:
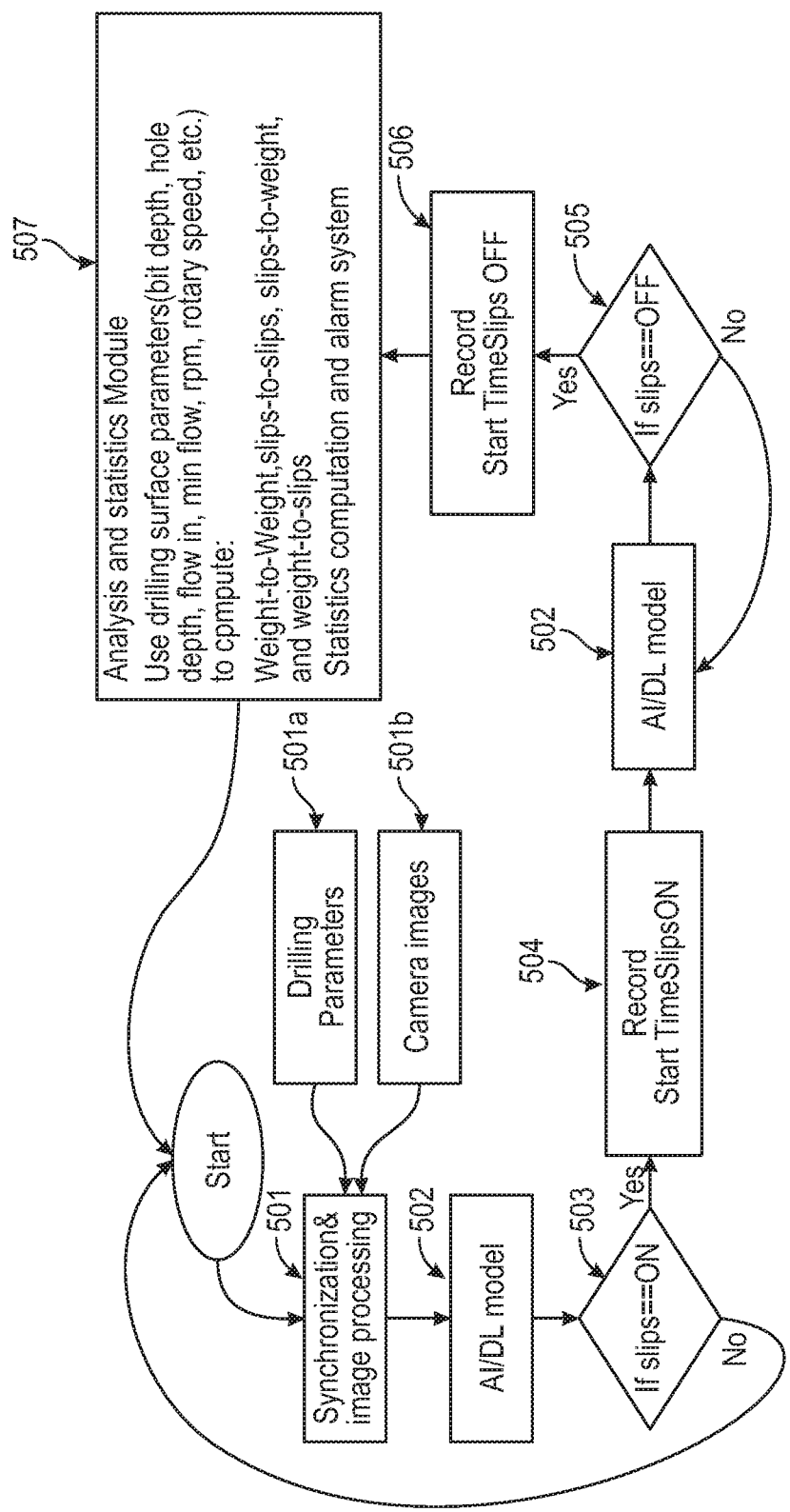

FIG. 5 illustrates an example system logic flowchart. As shown in FIG. 5, by way of the system logic workflow, surface parameters (501a) are synchronized (501) with the captured images (501b) and used to correctly identify slips-to-slips and slips-to-weight in the analysis and statistics module (507). In particular, the system logic flowchart is an example of collaboration between the AI engine (201), analysis engine (202), and statistics engine (203) described in reference to FIG. 2 above. Specifically, surface parameters (501a) include drilling parameter data from surface sensors (i.e., bit depth, hole depth, drilling mudflow, hook load, and rotations per minute) are provided as inputs to the DL model (502). Surface parameters (501a), captured images (501b), and DL model (502) are examples of the drilling rig parameters (206), the slips images (205), and the machine learning model (208), respectively, described in reference to FIG. 2 above. Providing the surface parameters (501a) to the DL model (502) increases the performance of the DL model (502) for the detecting the slips and differentiates between slips-to-slips during tripping or slips-to-slips during drilling. Camera images (501b) are primarily processed in still snapshot mode. Depending on processor speed, frames or snapshots are taken every few seconds, such as one sample per second (1 Hz). The DL models (502) belong to the supervised learning category, which requires a set of labeled data (i.e., training dataset) to train the model (502). Regional convolutional neural networks (R-CNN) or other variations (such as convolutional neural networks, fast R-CNN, faster R-CNN, You Only Look Once, among others) may be used to automatically identify the features describing the slips in the image. The label of each image/photo in the DL training dataset (i.e., training images (207)) corresponds to the rectangular coordinates surrounding the slips in the image frame. For example, the training dataset may include a set of images containing the slips at different positions (e.g., held by the crew, already positioned in the rotary table, etc.) and labeled with the coordinates where the slips are present. Consequently, the DL models learn the regions of interest (slips) and their location on the drilling rig floor. In order to compute the elapsed connection times (from the moment slips are used until the moment slips are removed), the system recognizes the event (503) when slips are placed in the rotary table with corresponding time (504) recorded as "StartTimeSlipsON," followed by the event (505) when slips are removed from the rotary table with corresponding time (506) recorded as "StartTimeSlipsOFF." In particular, the event (503) and event (505) correspond to two iteration loops of the method flowchart described in reference to FIG. 3 above. Finally, surface drilling parameters are used in the analysis and statistics module (507) to differentiate between weight-to-slips or slips-to-weight.

Figure 6:
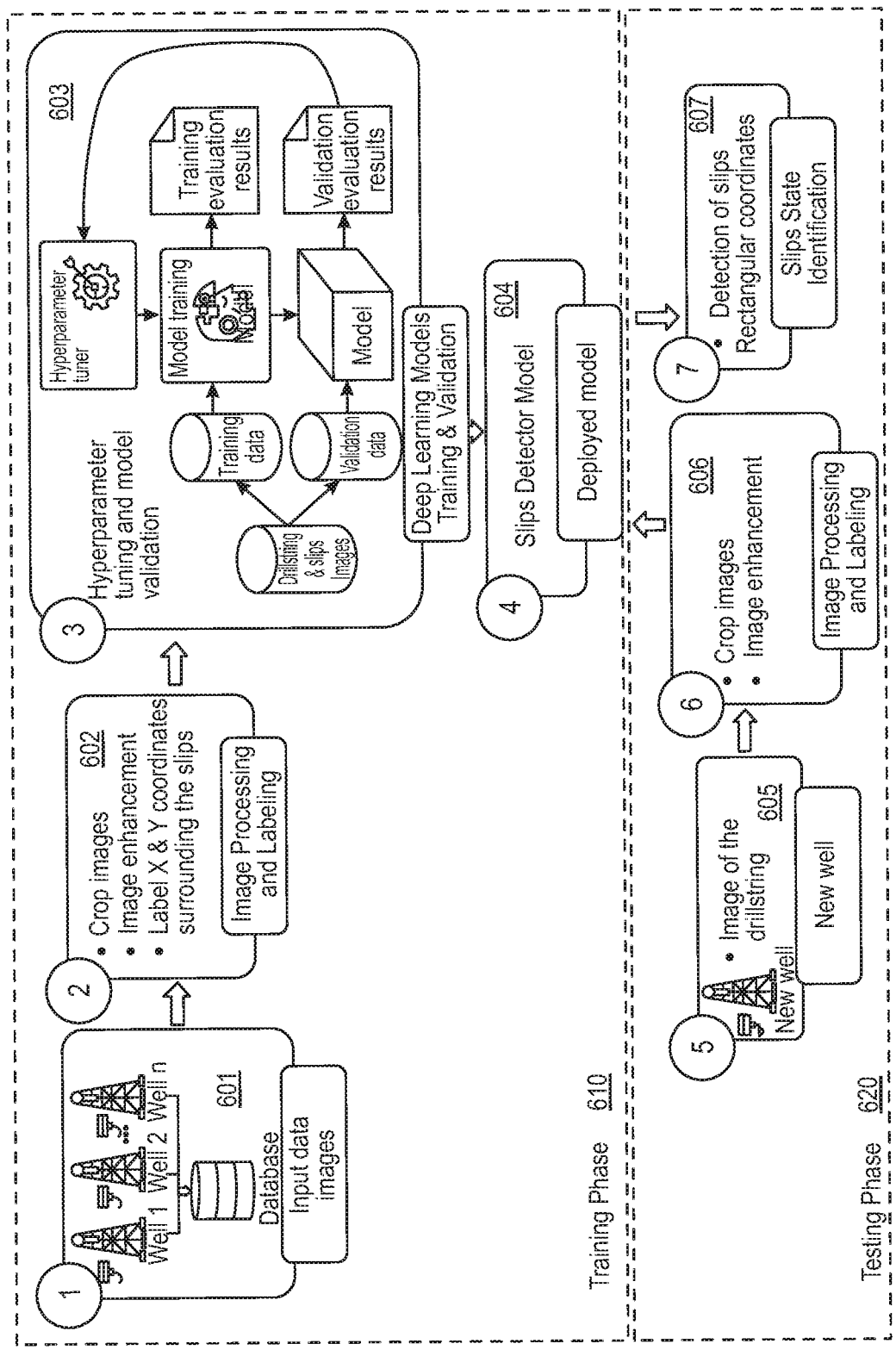

FIG. 6 illustrates example steps for the training phase (labeled "1" through "4") and testing phase (labeled "5" through "7") of the DL model (502) depicted in FIG. 5 above. The first step (601) of the training phase (610) includes capturing the slips at the rig floor with one or more cameras. The second step (602) includes simple image processing to crop and enhance the captured image frames, followed by assigning the labels (known slips coordinates in the image) to respective image frames. The processed and labeled image frames are examples of the training images (207) described in reference to FIG. 2 above. The third step (603) refers to the training and validation of the supervised learning models where a nested stratified cross-validation technique or any other data split technique is used to train and tune the DL model parameters. The DL model parameters may be trained and tuned under multiple combinations of drilling rig parameters (e.g., bit depth, hole depth, hook load, drilling mudflow, rotary speed, etc.). In the nested cross-validation, the inner k-fold cross-validation is used to tune the parameters of the model and is only performed on the training data, while the outer k-fold cross-validation is used to validate the final performance of the model. Finally, in the fourth step (604), the trained and validated model is deployed for the identification of the slips in the testing phase (620).

Steps labeled "5" through "7" relate to the testing phase (620) once the model is trained, validated, and deployed. In particular, steps (605) through (606) include video capturing of the slips at the rig floor and the image processing. As opposed to step (602), step (606) does not require known coordinates surrounding the slips, as this is the objective of the model. The processed images containing the drill floor surroundings for a new well are obtained in step (605) as the input for the deployed model in step (606), which outputs the coordinates of the slips (step (607)).

Figure 7A:
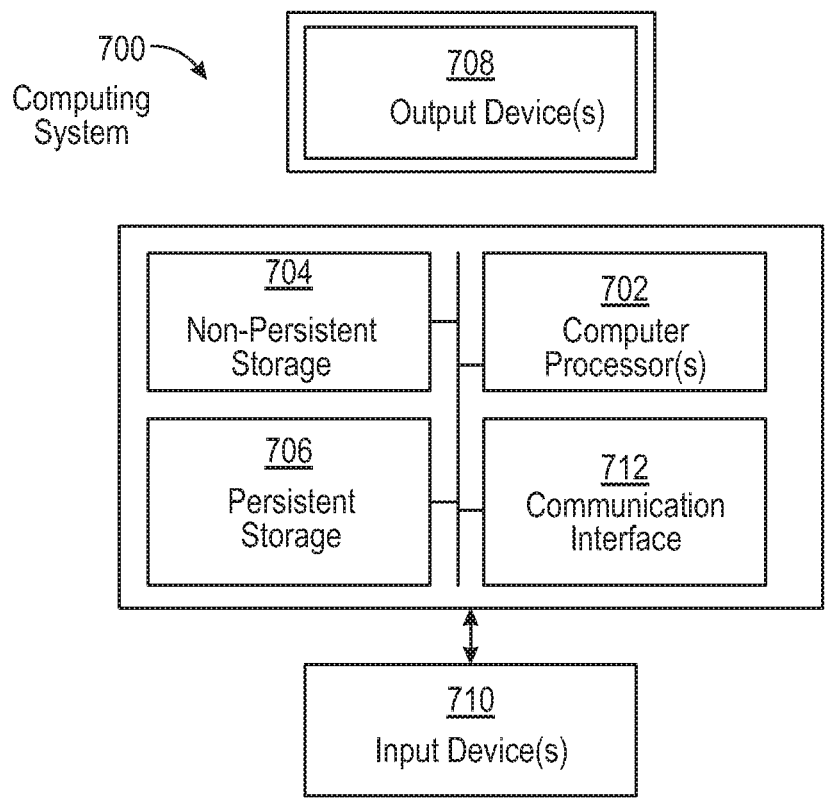
FIGS. 7A and 7B show a computing system in accordance with one or more embodiments.

Embodiments may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 7B:
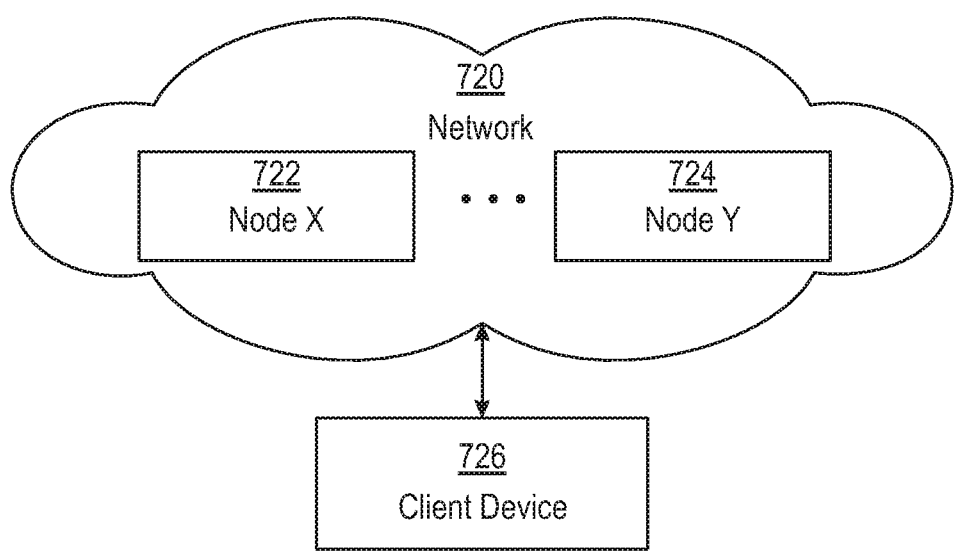

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the disclosure.

The computing system or group of computing systems described in FIGS. 7A and 7B may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system (700) in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the disclosure, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for determining a slips status during a drilling operation of a subterranean formation, the method comprising:
    capturing, using one or multiple camera devices mounted on a drilling rig of the drilling operation, a plurality of images, each of the plurality of images comprising a portion that corresponds to a slips device of the drilling rig;
    generating, using a sensor device of the drilling rig, a plurality of parameters of the drilling rig, wherein the plurality of parameters are synchronized with the plurality of images;
    providing, by a computer processor, the plurality of parameters as input to a machine learning model of the drilling rig; and
    analyzing, by the computer processor and based on the machine learning model, the plurality of images to generate the slips status.

2. The method of claim 1, further comprising:
    generating, by the computer processor and based at least on the slips status, slips status statistics comprising one or more of an elapsed slips-to-slips time, an elapsed slips-to-weight time, an elapsed weight-to-slips time, and an elapsed weight-to-weight time.

3. The method of claim 2, further comprising:
generating, by the computer processor and based at least on the slips status statistics, one or more of an alert and an actionable item; and
presenting, to a user, one or more of the slips status statistics, the alert, and the actionable item.

4. The method of claim 1, further comprising:
performing, by the computer processor, the drilling operation based at least on the slips status.

5. The method of claim 1, further comprising:
obtaining, in real-time and using one or more surface sensors of the drilling rig, the plurality of parameters of the drilling rig,
wherein the plurality of parameters of the drilling rig correspond to one or more of bit depth, hole depth, drilling mudflow, hook load, and rotary speed.

6. The method of claim 1, further comprising:
obtaining, in a training phase, a plurality of training images, each of the plurality of training images comprising a labeled portion that corresponds to the slips device of the drilling rig; and
generating, using data augmentation techniques, a synthetic set of images to expand the plurality of images;
generating, based at least on the plurality of training images, the machine learning model.

7. The method of claim 1,
wherein generating the slips status, by analyzing the plurality of images based on the machine learning model, is performed in a testing phase subsequent to the training phase.

8. A computer system for determining a slips status during a drilling operation of a subterranean formation, comprising:
a processor; and
a memory coupled to the processor and storing instruction, the instructions, when executed by the processor, comprising functionality for:
capturing, using one or more camera devices mounted on a drilling rig of the drilling operation, a plurality of images, each of the plurality of images comprising a portion that corresponds to a slips device of the drilling rig;
generating, using a sensor device of the drilling rig, a plurality of parameters of the drilling rig, wherein the plurality of parameters are synchronized with the plurality of images;
providing the plurality of parameters as input to a machine learning model of the drilling rig; and
analyzing, based on the machine learning model, the plurality of images to generate the slips status.

9. The computer system of claim 8, the instructions, when executed by the processor, further comprising functionality for:
generating, based at least on the slips status, slips status statistics comprising one or more of an elapsed slips-to-slips time, an elapsed slips-to-weight time, an elapsed weight-to-slips time, and an elapsed weight-to-weight time.

10. The computer system of claim 9, the instructions, when executed by the processor, further comprising functionality for:
generating, based at least on the slips status statistics, one or more of an alert and an actionable item; and
presenting, to a user, one or more of the slips status statistics, the alert, and the actionable item.

11. The computer system of claim 8, the instructions, when executed by the processor, further comprising functionality for:
performing the drilling operation based at least on the slips status.

12. The computer system of claim 8, the instructions, when executed by the processor, further comprising functionality for:
obtaining, in real-time and using one or more surface sensors of the drilling rig, the plurality of parameters of the drilling rig,
wherein the plurality of parameters of the drilling rig correspond to one or more of bit depth, hole depth, drilling mudflow, hook load, and rotary speed.

13. The computer system of claim 8, the instructions, when executed by the processor, further comprising functionality for:
obtaining, in a training phase, a plurality of training images, each of the plurality of training images comprising a labeled portion that corresponds to the slips device of the drilling rig;
generating, using data augmentation techniques, a synthetic set of images to expand the plurality of images; and
generating, based at least one the plurality of training images, the machine learning model.

14. The computer system of claim 8,
wherein generating the slips status, by analyzing the plurality of images based on the machine learning model, is performed in a testing phase subsequent to the training phase.

15. A non-transitory computer readable medium storing instructions executable by a computer processor for determining a slips status during a drilling operation of a subterranean formation, the instructions, when executed, comprising functionality for:
capturing, using one or more camera devices mounted on a drilling rig of the drilling operation, a plurality of images, each of the plurality of images comprising a portion that corresponds to a slips device of the drilling rig;
generating, using a sensor device of the drilling rig, a plurality of parameters of the drilling rig, wherein the plurality of parameters are synchronized with the plurality of images;
providing the plurality of parameters as input to a machine learning model of the drilling rig; and
analyzing, based on the machine learning model, the plurality of images to generate the slips status.

16. The non-transitory computer readable medium of claim 15, the instructions, when executed, further comprising functionality for:
generating, based at least on the slips status, slips status statistics comprising one or more of an elapsed slips-to-slips time, an elapsed slips-to-weight time, an elapsed weight-to-slips time, and an elapsed weight-to-weight time.

17. The non-transitory computer readable medium of claim 16, the instructions, when executed, further comprising functionality for:
generating, by the computer processor and based at least on the slips status statistics, one or more of an alert and an actionable item; and
presenting, to a user, one or more of the slips status statistics, the alert, and the actionable item.

18. The non-transitory computer readable medium of claim 15, the instructions, when executed, further comprising functionality for:
- performing the drilling operation based at least on the slips status.

19. The non-transitory computer readable medium of claim 15, the instructions, when executed, further comprising functionality for:
- obtaining, in real-time and using one or more surface sensors of the drilling rig, the plurality of parameters of the drilling rig,
- wherein the plurality of parameters of the drilling rig correspond to one or more of bit depth, hole depth, drilling mudflow, hook load, and rotary speed.

20. The non-transitory computer readable medium of claim 15, the instructions, when executed, further comprising functionality for:
- obtaining, in a training phase, a plurality of training images, each of the plurality of training images comprising a labeled portion that corresponds to the slips device of the drilling rig;
- generating, using data augmentation techniques, a synthetic set of images to expand the plurality of images; and
- generating, based at least one the plurality of training images, the machine learning model,
- wherein generating the slips status, by analyzing the plurality of images based on the machine learning model, is performed in a testing phase subsequent to the training phase.

* * * * *